June 8, 1948.   E. L. NOTESTEIN ET AL   2,443,114
AIRPLANE TOWING MECHANISM
Filed Jan. 15, 1945   2 Sheets-Sheet 1
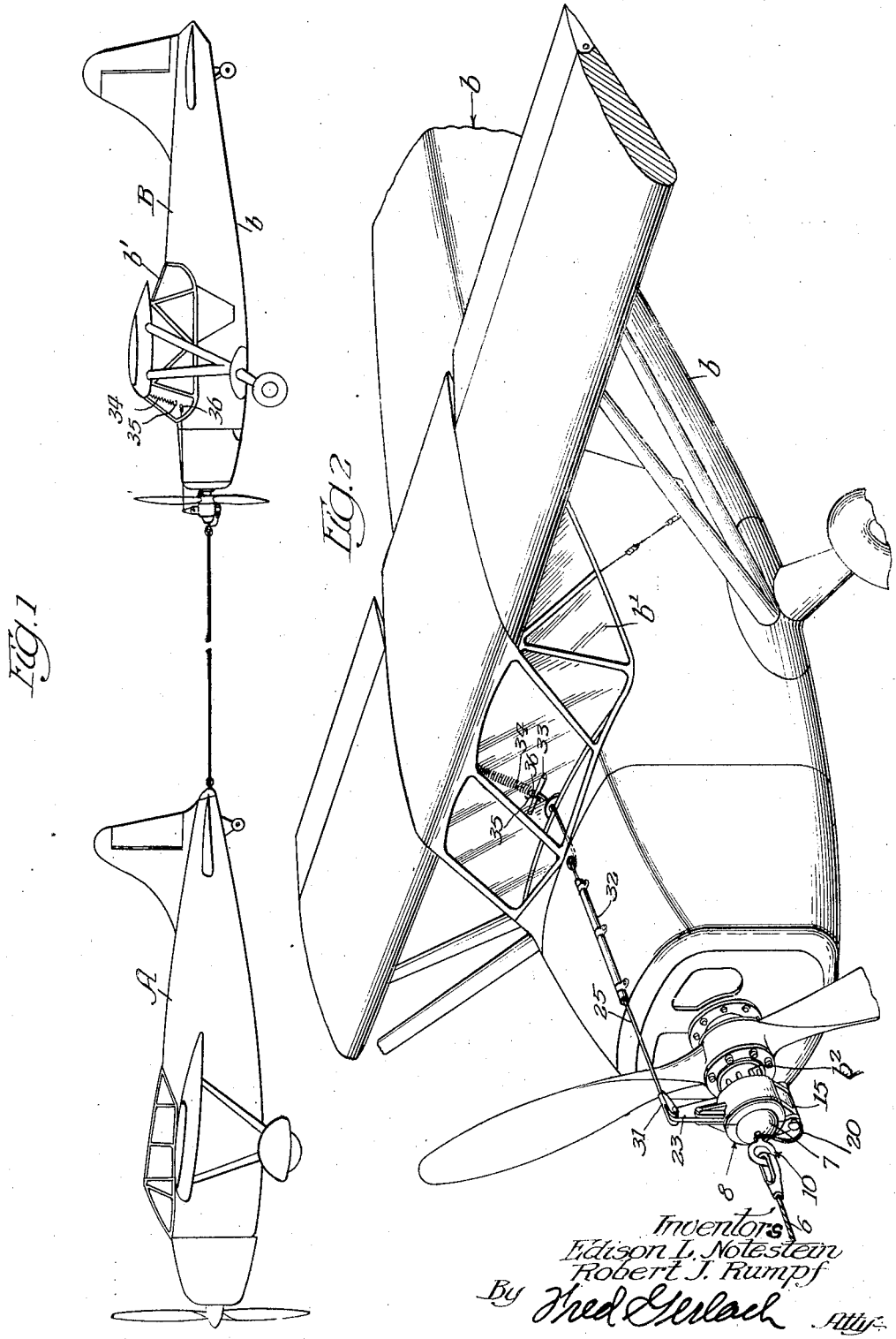
Inventors
Edison L. Notestein
Robert J. Rumpf
By Fred Gerlach Atty.

June 8, 1948.  E. L. NOTESTEIN ET AL  2,443,114
AIRPLANE TOWING MECHANISM
Filed Jan. 15, 1945  2 Sheets—Sheet 2
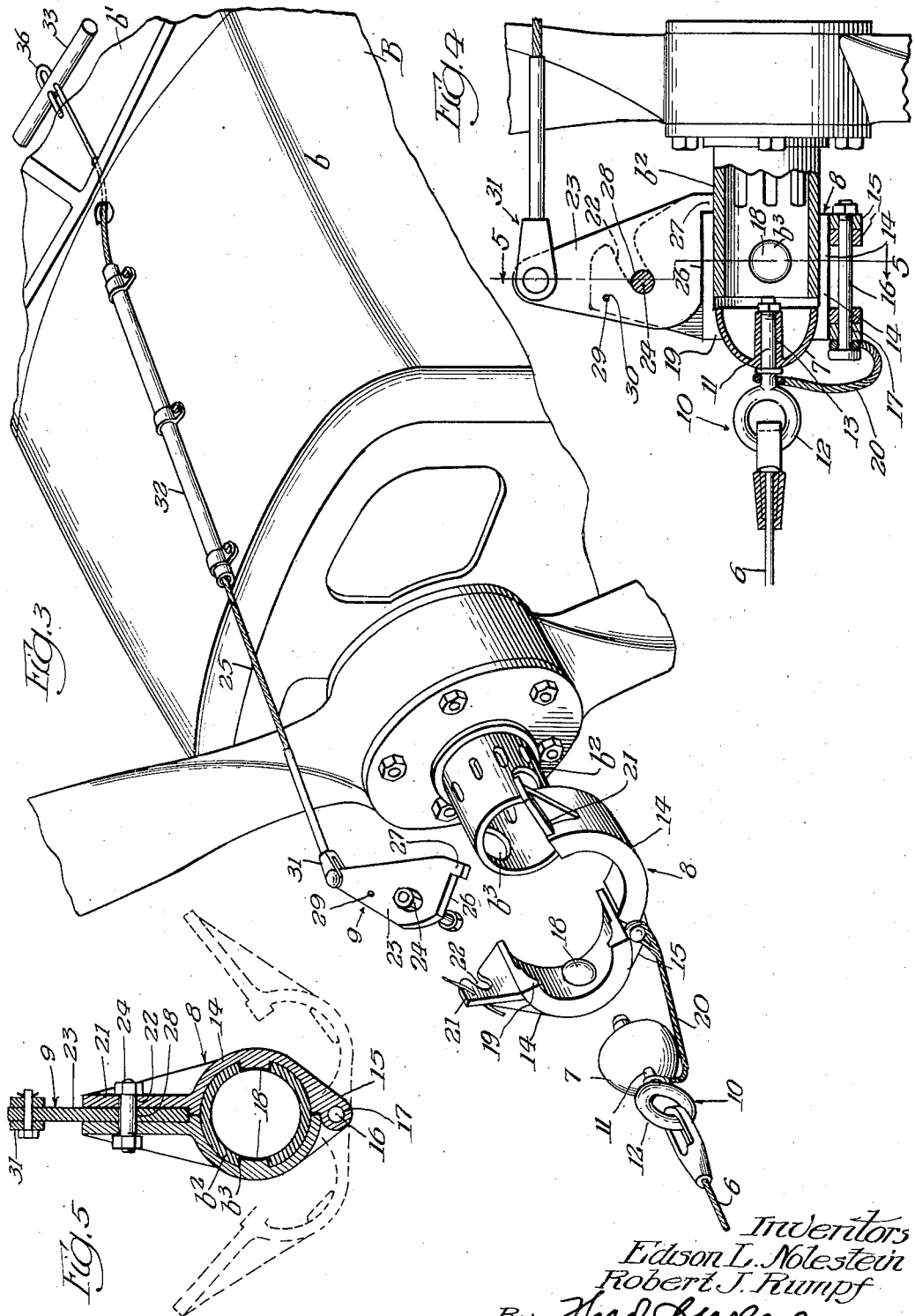
Inventors
Edson L. Notestein
Robert J. Rumpf
By Fred Gerlach atty Patented June 8, 1948

2,443,114

UNITED STATES PATENT OFFICE 2,443,114

AIRPLANE TOWING MECHANISM

Edison L. Notestein, Wayne, and Robert J. Rumpf, Dearborn, Mich., assignors to Consolidated Vultee Aircraft Corporation, San Diego, Calif., a corporation of Delaware Application January 15, 1945, Serial No. 572,840

8 Claims. (Cl. 244—3)

The present invention relates generally to towing mechanism. More particularly the invention relates to that type of towing mechanism which is expressly designed for use in towing an airplane in connection with flight thereof and is releasable in order that the airplane being towed may be disconnected from the tow airplane at any time during flight.

One object of the invention is to provide a towing mechanism of this type which is an improvement upon, and has certain inherent advantages over, previously designed mechanism for the same purpose and is characterized by high efficiency and the fact that it may be released at will by the pilot of the airplane being towed.

Another object of the invention is to provide an airplane towing mechanism which comprises a tow cable having at its front end any suitable means for attachment to the tow airplane and at its rear end a swivel variety connecting member, and also comprises a split collar the rear end of which embodies means for detachably connecting it to the propeller hub nut of the airplane being towed and the front end of which is provided with the socket for the swivel variety connecting member on the rear end of the tow cable.

Another object of the invention is to provide a towing mechanism of the last mentioned type and character in which the split collar consists of a pair of semi-circular sections certain opposed ends of which are pivotally connected together and the distal ends of which have associated therewith a latch device for releasably securing them together.

Another object of the invention is to provide an airplane towing mechanism of the type and character under consideration in which the socket at the front end of the split collar and the swivel variety connecting member on the rear end of the tow cable are so shaped and designed that when the latch device between the distal ends of the collar sections is released the swivel variety connecting member operates to spread apart the collar sections into an open position wherein they are released from the propeller hub nut of the airplane being towed.

Another object of the invention is to provide an airplane towing device of the last mentioned character in which the means for detachably connecting the rear end of the split collar to the propeller hub nut of the airplane being towed is in the form of a pair of lugs which are connected to and project inwards from the central portions of the collar sections, are adapted to fit within and interlock with the usual wrench holes in the propeller hub nut and are so designed and arranged that they become disengaged from the wrench holes in response to spreading apart of the collar sections.

A further object of the invention is to provide an airplane towing mechanism of the aforementioned character in which the collar is connected by a flexible element to the swivel variety connecting member in order that upon release of the latch device it is pulled away from the propeller hub nut of the airplane being towed, and the latch device for releasably securing the collar sections together comprises a lever type plate which is manipulable by the pilot of the airplane being towed through the medium of a release cable.

A still further object of the invention is to provide an airplane towing mechanism which effectively and efficiently fulfills its intended purpose, consists of but a comparatively small number of parts and may be produced at a low cost.

Other objects of the invention and the various advantages and characteristics of the present airplane towing mechanism will be apparent from a consideration of the following detailed description.

The invention consists in the several novel features which are hereinafter set forth and are more particularly defined by the claims of the conclusion hereof.

In the drawings which accompany and form a part of this specification or disclosure and in which like letters and numerals of reference denote like or corresponding parts through the several views:

Figure 1 is a side elevation showing a tow airplane and an airplane to be towed connected together by a towing mechanism embodying the invention;

Figure 2 is a fragmentary perspective showing the mechanism in its operative position wherein the split collar is in connected relation with the propeller hub nut of the towed airplane;

Figure 3 is a similar perspective showing the latch device, the collar and the swivel variety connecting member in their released positions;

Figure 4 is an enlarged vertical longitudinal section of the mechanism; and

Figure 5 is a transverse section on the line 5—5 of Figure 4.

The towing mechanism which is shown in the drawings constitutes the preferred form or embodiment of the invention. It is illustrated in connection with a tow airplane A and an airplane B to be towed and serves as a medium or instrumentality for releasably connecting the two airplanes together during flight. The airplane B is illustrated in the drawings as being of the conventional single engine tractor type and comprises a wing equipped fuselage $b$ having an enclosed pilot's compartment $b^1$ in the front central portion thereof. The front end of the fuselage $b$ houses the propeller driving engine (not shown) and the latter embodies a crank shaft the front end of which projects through the hub of the 10 propeller and is provided with a tubular nut $b^2$. The nut, as well understood in the art, serves to lock the propeller hub to the engine crank shaft and is located in front of the propeller hub. It is cylindrical so far as contour is concerned and embodies in the side portions of its front end a pair of diametrically opposite wrench holes $b^3$. The towing mechanism comprises as its principal components or parts a tow cable 6, a swivel type connecting member 7, a split collar 8 and a latch device 9.

The tow cable 6 is of any desired length and has any suitable means (not shown) at its front end for attachment to the rear end of the fuselage of the tow airplane A. The swivel type connecting member 7 is located at the rear end of the tow cable 6 and is connected to the latter by an eyebolt 10. As best shown in Figure 4 of the drawings, the member 7 is rearwardly flared as a result of the fact that it is hemispherical so far as shape or contour is concerned. The eyebolt 10 is of conventional design and consists of a nut equipped shank 11 and an eye 12. The shank 11 extends through an axially positioned bore 13 in the swivel variety connecting member 7 and has the eye 10 connected to its front end. The nut is mounted on the rear end of the shank of the eyebolt, abuts against the flat face of the member 7 and coacts with the eye 12 to hold the eyebolt against longitudinal axial displacement relatively to the member 7. When the towing mechanism is in use the curved or rounded surface of the member 7 faces forwards. The rear end of the cable 6 is provided with a loop which extends through the eye 12 of the eyebolt.

The split collar 8 serves releasably to connect the swivel variety connecting member 7 to the propeller hub nut $b^2$ and consists of a pair of complemental oppositely positioned semi-circular sections 14. It is contemplated that when the mechanism is in use or operation the engine for propelling the airplane B will be at rest and the propeller will be locked against so-called windmilling. The semi-circular sections 14 of the collar 8 are normally positioned in horizontal alignment and have a pivotal connection between their lower ends in order that they are capable of being swung to and from one another into and out of their normal operating position. The pivotal connection between the lower ends of the collar sections comprises a rectilinear series of lugs 15 on the lower ends of said collar sections and in addition a pivot pin 16. The lugs 15 are preferably formed as integral parts of the collar sections. They project inwards and downwards and have aligned holes 17 therethrough. The pivot pin 16 extends through the holes 17 and is suitably secured against and axially displaced with respect to the lugs 15. The rear end of the collar 8 is shaped to surround the propeller hub nut $b^2$ and embodies a pair of lugs 18 for detachably connecting it to the nut. The lugs 18 are preferably hemispherical and are connected to and project inwards from the central portions of the rear ends of the collar sections 14. They are adapted when the collar is in operative relation with the propeller hub nut $b^2$ to fit within and interlock with the wrench holes $b^3$ in the nut. When the collar sections 14 are spread or swung apart the lugs 18 become disengaged from the wrench holes $b^3$ thus disconnecting the collar from the nut. The front ends of the collar sections 14 are provided with integral inwardly extending arcuate flanges 19 the inner surfaces of which are concave in cross section and together define a rearwardly flared socket for the swivel variety connecting member 7 when the collar sections are in their closed or operative position. When the member 7 is in connected relation with the collar 8 while the collar sections are closed the curved or rounded surface of the member fits against the concave surfaces of the flanges 19 and the member is free to swivel within the socket which is formed by the flanges 19 of the collar sections. When the upper ends of the collar sections are released as hereinafter described forward tension on the swivel variety connecting member 7 results in the member camming or forcing the collar sections into their open positions wherein the lugs 18 are disengaged from the wrench holes $b^3$ in the propeller hub nut $b^2$. As soon as the collar sections are spread apart so as to disengage the lugs 18 from the wrench holes the collar 8 is freed from the nut and the towing connection between the two airplanes A and B is broken. The split collar 8 is connected to the eyebolt 10 by flexible connection 20 in order that it moves forwards with the member 7 upon release or spreading apart of the collar sections 14. The connection 20 is preferably in the form of a cord one end of which is anchored or attached to the pivot pin 16 and the other end of which is tied around or otherwise suitably secured to the shank 11 of the eyebolt 10. The upper ends of the collar sections 14 are provided with a pair of outwardly extending ears 21. These ears are preferably welded to the upper ends of the collar sections and are so arranged or located that they are spaced a small distance apart when the collar sections are in their closed position. The upper ends of the ears 21 are provided with upwardly and rearwardly extended notches 22 which register with one another when the collar sections are in their closed or normal operating position wherein the rear ends thereof surround and are interlocked with the propeller hub nut $b^2$.

The latch device 9 serves releasably to secure the collar sections in their closed position and coacts with the ears 21 on the upper ends of the collar sections. It is releasable by the pilot of the airplane B while the latter is in flight and being towed by the tow airplane A and consists of an upstanding vertically elongated lever type latch plate 23, a bolt 24 and a release cable 25. The lower portion of the plate 23 is adapted to fit between the ears 21 when the collar sections 14 are in their closed position and has at the bottom thereof a straight surface 26 and a depending finger 27 at the rear end of said surface. When the latch plate 23 is in its operative position wherein the lower portion thereof fits between ears 21 the straight surface 26 rests on the upper ends of the collar sections 14 and the depending finger 27 is in lapped relation with the rear face portions of said upper ends of the collar sections as shown in Figure 4. The bolt 24 of the latch device 9 extends through a hole 28 in the latch plate 23. Such hole is disposed above the front end of the straight surface 26 on the bottom of the lower portion of the latch plate.

The bolt consists of a shank having a head at one end thereof and a nut at its other end. When the latch device is in its operative position the ends of the shank of the bolt 24 fit within the notches 22 in the ears 21 and the head and nut at the ends of the shank fit against the outer faces of the ears and thus lock the ears together. When a rearward force is exerted on the upper end of the latch plate 23, the latch plate is caused to swing in a clockwise direction as viewed in Figure 4 resulting in the bolt 24 becoming disconnected from the ears 21 thus releasing the latch device 9 so that the collar sections 14 are free to swing apart. In connection with clockwise swinging or turning of the latch plate 23 the depending finger 27 serves as the fulcrum or articulation point for the plate. The ears 21 and latch plate 23 are provided with registering holes 29 through which a lock wire 30 may be inserted when the latch device is in its operative or latched position. When the latch device is released in response to clockwise turning of the latch plate 23 so as to disengage the bolt 24 from the notches 22 in the ears 21 the lock wire 30 is sheared or severed. The release cable 25 leads rearwards from the upper end of the latch plate 23 into the pilot's compartment $b^1$ in the fuselage of the airplane B and serves as an instrumentality for permitting the pilot of the airplane B to release the latch device 9 by swinging rearwards or in clockwise manner the latch plate 23. The front end of the cable 25 is pivotally connected to the upper end of the latch plate 23 by a clevis 31. The central portion of the cable extends through and fits slidably in a guide tube 32 which is mounted on the upper portion of and extends lengthwise with respect to the cowl for the propeller driving engine of the airplane B and leads into the pilot's compartment $b^1$. The rear end of the release cable 25 is disposed within the pilot's compartment $b^1$ and embodies a handle 33. In order to release the latch device 9, it is only necessary for the pilot of the airplane B to pull on the handle 33. When the handle is pulled the release cable 25 is pulled rearwards and results in clockwise turning of the latch plate 23. In order to hold the release cable 25 in its pulled back or retracted position and thus prevent the latch plate 23 from interfering with rotation of the propeller of the airplane B after release of the device 9 a coil spring 34 is provided. This spring is disposed in a depending position within the pilot's compartment $b^1$. The upper end of the spring is suitably anchored within the upper portion of the pilot's compartment and the lower end of the spring is provided with a hook 35 for attachment to an eye 36 on the handle 33 at the rear end of the release cable 25. After the release cable is pulled rearwards to effect release of the latch device 9 the spring 34 is distended and the hook 35 is inserted through the eye 36. Upon release of the spring after attachment of the hook to the eye the spring holds the cable 25 in its pulled back or retracted position wherein the latch plate 23 is disposed rearwards of the arc of swing of the propeller for the airplane B.

When it is desired to tow the airplane B by the tow airplane A the towing mechanism is connected or rendered operative by first swinging apart the collar sections 8. After the collar sections are swung or spread apart the hemispherical swivel variety connecting member 7 is positioned within the front ends of the collar sections and the collar sections are shifted around the propeller hub nut $b^2$. Thereafter the collar sections are swung together in order to bring the lugs 18 into interfitting relation with the wrench holes $b^3$ in the front end of the nut. As soon as the collar sections are swung together the collar is in connected relation with the propeller hub nut and the connecting member 7 is disposed in the flange formed socked in the front end of the collar and is free to swivel with respect to the collar. After swinging together the two collar sections the latch device 9 is rendered operative by inserting the lower portion of the latch plate 23 between the ears 21 and manipulating the plate into a position wherein the straight surface 26 rests on the upper ends of the collar sections and ends of the bolt 24 fit within the rearwardly and upwardly extended notches 22 in the upper ends of the ears 21. After the latch plate 23 is manipulated into place the lock wire 30 is inserted through the holes 29 and the ends thereof are twisted together. When the airplane B is being towed by the tow airplane A and it is desired to release the airplane B the pilot for the latter airplane pulls on the handle 33 so as to retract the release cable 25. Retraction of the release cable causes the latch plate 23 to turn in a clockwise direction as viewed in Figure 4 and results in disengagement of the bolt 24 from the notches 22 in the ears 21. As soon as the bolt 24 is disengaged or removed from the notches the swivel variety connecting member 7 cams or forces the collar sections 14 apart thereby effecting removal of the lugs 18 from the wrench holes $b^3$ in the propeller hub nut $b^2$ and effecting release of the collar from the nut. Immediately upon release of the collar from the nut the airplane B is free with respect to the tow airplane A. As a result of the fact that the collar 8 is connected to the swivel variety connecting member 7 by the flexible element 20 the collar travels or moves with the member after disconnection thereof from the propeller hub nut $b^2$. When the airplane B is released from the airplane A the pilot for the airplane B connects the lower end of the spring 34 to the eye 36 on the handle 33 in order to hold the release cable 25 in its pulled back or retracted position wherein as previously pointed out the latch plate 23 is disposed rearwards of the propeller of the airplane B. It is contemplated that directly after attachment of the spring 34 to the handle 33 the pilot for the airplane B will start the engine in order to effect propulsion of the airplane B as the result of drive of the propeller.

The herein described towing mechanism effectively and efficiently fulfills its intended purpose and may be released with facility. It consists of but a small number of parts and hence may be produced at a low or reasonable cost. By reason of the fact that the towing mechanism includes the releasable latch device 9, the mechanism may be released at the will of the pilot for the airplane that is being towed.

The invention is not to be understood as restricted to the details set forth since these may be modified within the scope of the appended claims without departing from the spirit and scope of the invention.

Having thus described the invention what we claim as new and desire to secure by Letters Patent is:

1. A mechanism designed for use in flight towing by a tow aircraft an aircraft with a forwardly extending element, and comprising a tow cable having the front end thereof adapted for attachment to the tow aircraft, a split collar at the rear end of the tow cable, shaped to extend around the element, consisting of a pair of oppositely disposed complemental sections having certain opposed ends thereof pivotally connected together and their distal ends provided with releasable means for securing them together, embodying on one section thereof means for interfitting with the element, and adapted upon release of the releasable securing means to have its sections spread apart and render ineffective the interfitting means, and means connected to said rear end of the tow cable and operative during towing of the second mentioned aircraft and upon release of said releasable securing means automatically and substantially instantaneously to spread apart the collar sections.

2. A mechanism designed for use in flight towing by a tow airplane a tractor type airplane having in front of its propeller a cylindrical propeller hub nut with side holes therein, and comprising a tow cable having the front end thereof adapted for attachment to the tow airplane, a split collar at the rear end of the tow cable, shaped to extend around the nut, consisting of a pair of oppositely disposed complemental sections having certain opposed ends thereof pivotally connected together in order that the sections are free to swing to and from one another into and out of a normal operating position, provided at the distal ends of the sections with releasable means for securing the sections in their operating position, embodying inwardly extending lugs on the sections for interfitting with the holes in the nut when the sections are in their said operating position, and adapted upon release of the releasable securing means and spreading apart of its sections to have the lugs withdrawn from the holes in the nut, means connected to said rear end of the tow cable and operative automatically and substantially instantaneously during towing of the tractor type airplane and upon release of said releasable securing means to spread the collar sections apart, and a flexible connection between the collar and said rear end of the tow cable whereby the collar is caused to follow the tow cable after disconnection thereof from the nut due to spreading apart of the collar sections.

3. A mechanism designed for use in flight towing by a tow airplane a tractor type airplane having a pilot's compartment therein and in addition a cylindrical propeller hub nut with side holes therein, and comprising a tow cable having the front end thereof adapted for attachment to the tow aircraft, a split collar at the rear end of the tow cable, shaped to fit over the nut, consisting of a pair of oppositely disposed complemental semi-circular sections having certain opposed ends thereof pivotally connected together in order that the sections are free to swing to and from one another into and out of a normal operating position, provided at the distal ends of the sections with releasable means for securing the sections in their operating position, embodying inwardly extending lugs on the central portions of the sections for interfitting with the holes in the nut when the sections are in their said operating position, and adapted upon release of the releasable securing means and spreading apart of its sections to have the lugs removed from the holes in the nut, means manipulable from the pilot's compartment of the tractor type airplane for releasing said releasable securing means at will, and means connected to the rear end of the tow cable and operative automatically and substantially instantaneously during towing of said tractor type airplane and upon release of said releasable means to spread the collar section apart.

4. A mechanism designed for use in flight towing by a tow aircraft an aircraft having at the front end thereof a forwardly extending element, and comprising a tow cable having the front end thereof adapted for attachment to the tow aircraft, a swivel variety rearwardly flared connecting member attached to the rear end of the tow cable, and a split collar in the form of a pair of oppositely disposed complemental sections, having one end thereof shaped to fit around and interfit with the element and its front end provided with a rearwardly flared socket for the connecting member, having certain opposed ends of its sections pivotally connected together, embodying releasable means at the distal ends of the sections for securing the sections together, and adapted upon release of the releasable means while the second mentioned airplane is being towed and in response to the wedge action of the connecting member on the socket due to forward pull by the tow cable to have its sections automatically spread apart into an open position wherein they release said connecting member and element.

5. A mechanism designed for use in flight towing by a tow aircraft an aircraft having at the front thereof a forwardly extending cylindrical element with side holes therein, and comprising a tow cable having the front end thereof adapted for attachment to the tow aircraft, a swivel variety rearwardly flared connecting member attached to the rear end of the tow cable, and a split collar in the form of a pair of oppositely disposed complemental semi-circular sections, having the rear end thereof shaped to fit around the element and provided with inwardly extending lugs for interfitting with the side holes in the element, and its front end provided with a rearwardly flared socket for the connecting member, having certain opposed ends of its sections pivotally connected together, embodying releasable means at the distal ends of its sections for securing the sections together, and adapted upon release of the releasable securing means while the second mentioned aircraft is being towed and in response to the wedge action of the connecting member on the socket due to forward pull by the tow cable to have its sections automatically spread apart into a releasing position wherein the lugs are disengaged from the holes in the element and the connecting member is free.

6. A mechanism designed for use in flight towing by a tow aircraft an aircraft having at the front end thereof a forwardly extending element, and comprising a tow cable having the front end thereof adapted for attachment to the tow aircraft, a swivel variety rearwardly flared connecting member attached to the rear of the tow cable, a split collar in the form of a pair of oppositely disposed complemental sections, having the rear end thereof shaped to fit around and interfit with the element and its front end provided with a rearwardly flared socket for the connecting member, having certain opposed ends of its sections pivotally connected together, embodying releasable means at the distal ends of the sections for securing the sections together, and adapted upon release of the releasable means while the second mentioned aircraft is being towed and in response to the wedge action of said connecting member on the socket due to forward pull by the tow cable to have its sections automatically spread apart into an open position wherein they release said connecting member and element, and means for tying the collar to said rear end of the tow cable so that it is caused to follow the cable and tow aircraft after it is released or disconnected from said element.

7. A mechanism designed for use in flight towing by a tow aircraft an aircraft having at the front end thereof a forwardly extending element, and comprising a tow cable having the front end thereof adapted for attachment to the tow aircraft, a swivel variety rearwardly flared connecting member attached to the rear end of the tow cable, a split collar in the form of a pair of oppositely disposed complemental sections, having the rear end thereof shaped to fit around and interfit with the element and its front end provided with a rearwardly flared socket for the connecting member, having certain opposed ends of its sections pivotally connected together, embodying releasable means at the distal ends of the sections for securing the sections together, and adapted upon release of the releasable means while the second mentioned aircraft is being towed and in response to the wedge action of the connecting member on the socket due to forward pull by the tow cable to have its sections automatically spread apart into an open position wherein they release said connecting member and element, tie means for tying the collar to said rear end of the tow cable in order that it follows the cable and tow aircraft after it is released or disconnected from the element, and means manipulable from said second mentioned aircraft for releasing said releasable securing means at will.

8. A mechanism designed for use in flight towing by a tow aircraft an aircraft having a pilot's compartment therein and in addition a forwardly extending element in front of the compartment, and comprising a tow cable having the front end thereof adapted for attachment to the tow aircraft a swivel variety rearwardly flared connecting member attached to the rear end of the tow cable, a split collar shaped to extend around the element, having its front end provided with a rearwardly flared socket for the connecting member, consisting of a pair of oppositely disposed complemental sections having certain opposed ends thereof pivotally connected together in order that the sections are free to swing to and from one another into and out of a normal operating position, provided at the distal ends of the sections with notched outwardly extending ears, embodying on the sections means for interfitting with the element when the sections are in their said operating position, and adapted when the sections are swung apart to have the interfitting means released and thereby effect disconnection of the collar from the element and connecting member, and a latch device for releasably securing the collar sections in their said operating position, embodying a lever type latch plate shaped to fit between the ears, provided with parts for interlocking with the notches in the ears, and adapted when moved in one direction to disconnect said parts from the notches, a release cable for moving the plate in said one direction having one end thereof connected to the plate and its other end leading into the pilot's compartment of the second mentioned airplane and means for tying the collar to the rear end of the tow cable in order that it follows the tow cable upon disconnection thereof from the element.

EDISON L. NOTESTEIN.
ROBERT J. RUMPF.

REFERENCES CITED

The following references are of record in the file of this patent:

UNITED STATES PATENTS

| Number | Name | Date |
| --- | --- | --- |
| 1,027,481 | Huff | May 28, 1912 |
| 1,418,783 | Fokker | June 6, 1922 |
| 1,451,658 | Hennekin | Apr. 10, 1923 |
| 1,827,933 | Davis | Oct. 20, 1931 |
| 1,926,968 | Causan | Sept. 12, 1933 |